(12) United States Patent
Oesterling et al.

(10) Patent No.: US 8,335,502 B2
(45) Date of Patent: Dec. 18, 2012

(54) METHOD FOR CONTROLLING MOBILE COMMUNICATIONS

(75) Inventors: Christopher L. Oesterling, Troy, MI (US); Sanjeev C. Mirle, Troy, MI (US); John J. Correia, Livonia, MI (US)

(73) Assignee: General Motors LLC, Detroit, MI (US)

( * ) Notice: Subject to any disclaimer, the term of this patent is extended or adjusted under 35 U.S.C. 154(b) by 140 days.

(21) Appl. No.: 12/887,242

(22) Filed: Sep. 21, 2010

(65) Prior Publication Data

US 2012/0071140 A1    Mar. 22, 2012

(51) Int. Cl.
*H04W 88/02* (2009.01)

(52) U.S. Cl. ........................................ 455/419

(58) Field of Classification Search ........... 455/418–420
See application file for complete search history.

(56) References Cited

U.S. PATENT DOCUMENTS

| | | | |
|---|---|---|---|
| 7,050,834 B2 | 5/2006 | Harwood et al. | |
| 7,218,925 B2 * | 5/2007 | Crocker et al. | 455/419 |
| 7,505,784 B2 | 3/2009 | Barbera | |
| 7,548,491 B2 | 6/2009 | Macfarlane | |
| 7,688,197 B2 * | 3/2010 | Becker et al. | 340/539.13 |
| 2007/0082614 A1 * | 4/2007 | Mock | 455/41.2 |
| 2009/0163243 A1 | 6/2009 | Barbera | |
| 2009/0215466 A1 | 8/2009 | Ahl et al. | |
| 2009/0275321 A1 | 11/2009 | Crowe | |
| 2010/0148920 A1 | 6/2010 | Philmon et al. | |
| 2011/0098028 A1 * | 4/2011 | Economos et al. | 455/418 |

* cited by examiner

*Primary Examiner* — Diane Mizrahi
(74) *Attorney, Agent, or Firm* — Dierker & Associates, P.C.

(57) ABSTRACT

A method for controlling mobile communications involves identifying an operator of the mobile vehicle, where the operator is associated with the mobile communications device. The method further includes recognizing, via a telematics unit in the mobile vehicle, a first in-vehicle trigger to initiate a vehicle data upload event with a telematics service center. The vehicle data for the vehicle data upload event includes information of the mobile vehicle and of the operator of the mobile vehicle. Upon receiving the vehicle data at the telematics service center, transmitting a request from the service center to a mobile communications service provider to disable at least one of an incoming communication for the mobile communications device or an outgoing communication from the mobile communications device. The method further involves disabling the incoming and/or outgoing communication.

20 Claims, 1 Drawing Sheet

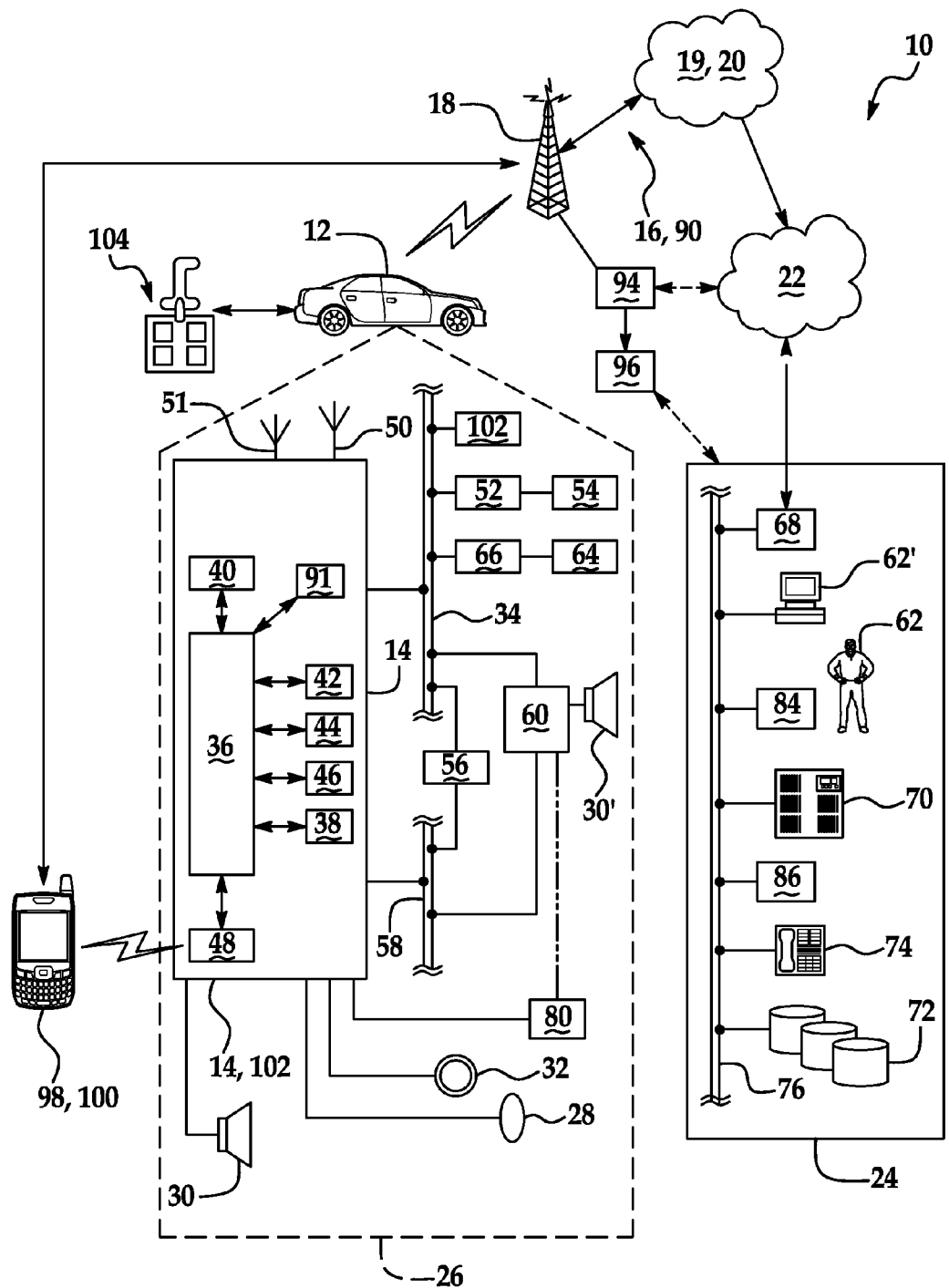

METHOD FOR CONTROLLING MOBILE COMMUNICATIONS

TECHNICAL FIELD

The present disclosure relates generally to methods for controlling mobile communications.

BACKGROUND

Cellular technology has enabled users of mobile communications devices to establish voice and/or data connections with other mobile devices and/or landline units. An example of a data connection includes sending and/or receiving text messages, and is often referred to as "text messaging" or simply "texting". Typically, texting requires at least some attention from the user and, in most cases, the use of at least one of the user's hands, to perform one or more tasks associated with the texting. If a user is texting while also being engaged in another activity, such as when operating machinery, while driving a vehicle, and/or the like, the user's attention may be diverted, and he/she may become distracted while performing the other activity.

SUMMARY

A method for controlling mobile communications is disclosed herein. The method involves identifying an operator of a mobile vehicle, where the operator is associated with a mobile communications device. The method further includes recognizing, via a telematics unit in the mobile vehicle, a first in-vehicle trigger, which initiates a vehicle data upload event with a telematics service center. The vehicle data for the vehicle data upload event includes information of the mobile vehicle and of the operator of the mobile vehicle. Upon receiving the vehicle data at the telematics service center, via a communications module associated with the telematics service center, a request is transmitted to a mobile communications service provider to disable an incoming communication for the mobile communications device and/or an outgoing message from the mobile communications device. Upon receiving and processing the request, the incoming and/or outgoing communication is disabled.

BRIEF DESCRIPTION OF THE DRAWING

Features and advantages of examples of the present disclosure will become apparent by reference to the following detailed description and the drawing.

FIG. 1 is a schematic diagram depicting an example of a system for controlling mobile communications.

DETAILED DESCRIPTION

Example(s) of the method disclosed herein may be used to disable incoming and/or outgoing communications to/from a user's mobile communications device. The disabling may occur when the user is engaged in an activity other than one involving the mobile communications device. The method may also be used to re-enable the communication(s) after having been disabled. Examples of the activities in which the user may be engaged that may initiate the disabling include driving a mobile vehicle, operating other machinery, performing a physical activity, and/or any other activity that requires a user's attention. The disabling of the communication(s) advantageously allows the user to focus on the activity that he/she is then-currently engaged in, at least in part because distractions that may be associated with use of the mobile device are reduced or even eliminated. For example, if incoming communications (via, e.g., a text message service) are disabled, the user may focus all of his/her attention on the activity (such as driving a vehicle) rather than on reading and responding to incoming text messages.

The examples of the method disclosed herein are particularly useful for activities that occur while the user (and thus the mobile communications device) is located inside of a mobile vehicle. Further, the disabling of the communication(s) to/from the mobile device (as well as re-enabling of the communication(s) after the communication(s) has been disabled) may be accomplished by a communications service provider (such as e.g., VERIZON®, SPRINT®, etc.). In an example, the disabling (or re-enabling) is initiated in response to a trigger detected by a telematics unit. The disabling by the communications service provider enables communications to/from the mobile device to be controlled without any involvement by the mobile device. Thus, no applications need to be stored on and executed by the mobile device in order to accomplish the examples of the method disclosed herein. By disabling the communication(s) to/from the mobile device, the user can advantageously focus his/her attention, e.g., on driving rather than on using his/her mobile device.

As used herein, one example of a "text message" is a short, text-based message that may be transmitted over a cellular network between two or more mobile communications devices. A single text message may be limited to a predefined number of characters (e.g., 100 characters, 160 characters, etc.), which may, for example, be typed into the mobile device using a keypad, touch screen, or the like. Text messages are often referred to as short message service (SMS) messages, which are messages transmitted between two or more mobile devices using a short message service communication protocol. Other examples of text messages include images without any text, or images in conjunction with text. It is to be understood that any other type of message that may be transmitted between mobile devices not mentioned here is also considered to be a text message for purposes of this disclosure. Examples of other types of messages include, but are not limited to, multimedia message service (MMS) messages, e-mails, voice messages, and/or the like.

It is to be understood that, as used herein, the term "user" includes any person in possession of a mobile communications device that is subject to having incoming and/or outgoing communications disabled and re-enabled by a communications service provider. The "user" may therefore be a vehicle owner, a vehicle driver, and/or a vehicle passenger. In instances where the "user" is the vehicle owner, the term "user" may be used interchangeably with the term subscriber/service subscriber.

Additionally, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, the term "communication" is to be construed to include all forms of communication, including direct and indirect communication. As such, indirect communication may include communication between two components with additional component(s) located therebetween.

FIG. 1 described in detail below depicts a system (identified by reference character 10) for controlling mobile communications. The mobile communications that are controlled are those that would otherwise be sent to/from a mobile communications device when, for example, a user of the device is engaged in operating a mobile vehicle. For purposes of the instant disclosure, the mobile communications device may be selected from any mobile device capable of receiving and sending text or SMS messages, an example of which includes a mobile cellular phone. As mentioned above, examples of the method are particularly useful for activities that occur involving a mobile vehicle (such as driving, for example), at least in part because the methods use a vehicle dedicated communications device (i.e., a telematics unit) to identify the vehicle and the vehicle operator. It is to be understood, however, that the examples of the method disclosed herein are not to be limited to activities that only involve a vehicle, and that a skilled artisan will know how to modify the teachings of the instant disclosure in order to apply the method while the user is engaged in another activity. For instance, the method may be applied when the user is engaged in operating construction equipment so long as the construction equipment has associated therewith a communications device that may identify the vehicle and the vehicle operator in order to initiate the disabling and/or re-enabling of communications of the mobile device while the user is engaged in operating the equipment.

The system 10 generally includes a mobile vehicle 12, a telematics unit 14 operatively disposed in the mobile vehicle 12, a carrier/communication system 16 (including, but not limited to, one or more cell towers 18, one or more base stations 19 and/or mobile switching centers (MSCs) 20, and one or more service providers (not shown) including mobile network operator(s)), one or more land networks 22, and one or more telematics service/call centers 24. In an example, the carrier/communication system 16 is a two-way radio frequency communication system.

The wireless carrier/communication system 16 may be used to establish communication between a mobile communications device 98 and the telematics unit 14. For example, a user of the mobile communications device 98 (e.g., when outside the vehicle 12) may call the telematics unit 14 over the wireless carrier/communication system 16. When the mobile device 98 is located within close proximity (i.e., a distance suitable for short range wireless communication) of the telematics unit 14, communication between the mobile device 98 and the telematics unit 14 may otherwise be established via short range wireless connection (e.g., by pairing the telematics unit 14 and the mobile device 98 using a BLUETOOTH® unit or the like). In one example, the mobile device 98 is in close proximity to the telematics unit 14 when the mobile device 98 is inside the passenger compartment of the mobile vehicle 12. Further details of pairing the mobile device 98 with the telematics unit 14 will be provided below.

As mentioned above, the mobile communications device 98 may be selected from any mobile device capable of receiving and sending text or SMS messages. The device 98 is generally equipped with suitable components enabling a user to establish communication with other devices. For example, the device 98 further includes a processor (identified by reference numeral 100, but not specifically shown in FIG. 1) configured to run software programs for performing various functions of the device 98.

In an example, the carrier/communication system 16 also includes a host server 94 including suitable computer equipment (not shown) upon which information of a remotely accessible page 96 resides/is stored. This remotely accessible page 96 may be used, e.g., to register a key fob 104 for a particular mobile vehicle 12, to assign preset operating conditions of the mobile device 98 associated with the possessor of the registered key fob 104, etc. The remotely accessible page 96 is a webpage set up and maintained by a network provider 90 or a telematics service provider, and the user may access the page 96 by, e.g., submitting personal (e.g., a login ID) and authenticating information (e.g., a password, a PIN, etc.). The computer equipment used to log into the page 96 may also include hardware, which, for example, can receive and read a smart card for identification/authentication purposes, or can utilize biometrics for identification/authentication purposes.

The overall architecture, setup and operation, as well as many of the individual components of the system 10 shown in FIG. 1 are generally known in the art. Thus, the following paragraphs provide a brief overview of one example of the system 10. It is to be understood, however, that additional components and/or other systems not shown here could employ the method(s) disclosed herein.

Vehicle 12 is a mobile vehicle, such as a motorcycle, car, truck, recreational vehicle (RV), boat, plane, etc., and is equipped with suitable hardware and software that enables it to communicate (e.g., transmit and/or receive voice and data communications) over the carrier/communication system 16.

Some of the vehicle hardware 26 is shown generally in FIG. 1, including the telematics unit 14 and other components that are operatively connected to the telematics unit 14. Examples of other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device that provides a variety of services, both individually and through its communication with the service center 24. In an example, the service center 24 is a facility that may be owned and operated by the telematics service provider. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

As mentioned above, the short range wireless communication network 48 (e.g., the BLUETOOTH® unit) may be used to pair the mobile communications device 98 with the telematics unit 14. In an example, the telematics unit 14 continuously monitors for the presence of the mobile device 98 (which may be identified by a unique media access control (MAC) identifier) using a short range wireless antenna 51, and attempts to pair the device 98 with the telematics unit 14 upon recognizing the MAC, and thus the presence of the mobile device 98. The mobile device 98 and the telematics unit 14 are actually paired when the telematics unit 14 and the mobile device 98 exchange security codes/passwords with each other, which enables the telematics unit 14 and the mobile device 98 to communicate typically under a secured connection. Once the two units 14, 98 have been paired, the telematics unit 14 can directly communicate with the mobile device 98 if desired.

It is to be understood that the telematics unit 14 may be implemented without one or more of the above listed components (e.g., the real time clock 46). It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. In a non-limiting example, the electronic processing device 36 (also referred to herein as the processor 36) includes software programs having computer readable code to initiate and/or perform one or more steps of the method disclosed herein. For instance, the software programs may include computer readable code for recognizing an in-vehicle trigger and, upon making the recognition, initiating a vehicle data upload event with the telematics service center 24. The vehicle data is uploaded to the service center 24 using a vehicle data upload (VDU) system 91 (which will be described in further detail below), and such data includes identification information of the mobile vehicle 12 and of the operator of the mobile vehicle 12.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies, such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request date and time information. In an example, the RTC 46 may provide date and time information periodically, such as, for example, every ten milliseconds.

The electronic memory 38 of the telematics unit 14 may be configured to store data associated with the various systems of the vehicle 12, vehicle operations, vehicle user preferences and/or personal information, and the like.

The telematics unit 14 also includes the vehicle data upload (VDU) system 91 (mentioned above), which is configured to receive raw vehicle data from the bus 34, packetize the data, and upload the packetized raw data to the telematics service center 24 (or other external entity). In one example, the VDU 91 is operatively connected to the processor 36 of the telematics unit 14, and thus is in communication with the service center 24 via the bus 34 and the carrier/communication system 16. In another example, the VDU 91 may be the telematics unit's 14 central data system that can include a modem, a processor, and an on-board database. The database can be implemented using a separate network attached storage (NAS) device or be located elsewhere, such as in memory 38, as desired. The VDU system 91 has an application program that handles the vehicle data upload processing, including communication with the service center 24 and the setting and processing of triggers which initiate a data upload event.

The telematics unit 14 provides numerous services alone or in conjunction with the service center 24, some of which may not be listed herein, and is configured to fulfill one or more user or subscriber requests. Several examples of these services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when these services are obtained from the service center 24, the telematics unit 14 is considered to be operating in a telematics service mode.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speaker(s) 30, 30' provides verbal output to the vehicle occupants and can be either a stand-alone speaker 30 specifically dedicated for use with the telematics unit 14 or can be part of a vehicle audio component 60 (see speaker 30'). In either event and as previously mentioned, microphone 28 and speaker(s) 30, 30' enable vehicle hardware 26 and telematics service center or provider 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the telematics service center 24 (whether it be a live advisor 62 or an automated call response system 62') to request emergency services, for example.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30, 30' via arbitration on vehicle bus 34 and/or audio bus 58.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain vehicle data for use by the telematics unit 14 or the service center 24 (when transmitted thereto from the telematics unit 14) to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

As will be described in detail below, the example(s) of the method disclosed herein are accomplished, in part, by identifying an operator of the mobile vehicle 12. Upon identifying the operator, the mobile device 98 subject to the disabling and/or re-enabling may also be identified or otherwise targeted. In one example, the vehicle 12 may include a module 102, which may be any computational box that is configured to make the identification(s). Examples of the module 102 include a body control module (BCM), a human machine interface (HMI), and/or the like. In some instances, the telematics unit 14 may be integrated with or contain a BCM, and thus is configured to identify the vehicle 12 operator. In these instances, the telematics unit 14 may be considered the module 102. In an example, the module 102 identifies the vehicle 12 operator by identifying a key fob 104 associated with the vehicle 12 operator. The key fob 104 is configured to activate various in-vehicle functions such as, e.g., a keyless entry function, a door unlock function, a panic alarm function, and/or the like. A single key fob 104 may, for example, be personalized for a single vehicle operator. In instances where the vehicle 12 has several operators, each operator may have his/her own personal key fob 104. In other words, the vehicle 12 may have one, two, three, or more key fobs 104 depending, at least in part, on the number of designated vehicle 12 operators. In an example, each key fob 104 includes a memory (not shown) configured to store information personal to a vehicle operator previously associated or registered with the key fob 104, and an internal processor (also not shown). When the key fob 104 is actuated by the vehicle 12 operator to initiate a vehicle function, the key fob 104 may be detected and the vehicle 12 operator may be identified by the module 102.

A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. The wireless portion of the carrier/communication system 16 further includes other supporting systems, including SMSCs or short message service controllers, which are systems specifically designed to send, deliver, and/or transmit SMS or text messages to a desired destination (such as to the mobile device 98). The SMSCs also manage the queuing of messages. It is to be understood that SMSCs are not part of the actual radio link/channels, but are part of the core network systems of the communications service provider 90. The sending, delivering, and/or transmitting of the SMS messages to the communications service/network provider 90 may be accomplished using short message peer-to-peer (SMPP) protocol (i.e., a protocol for exchanging SMS messages between SMS peer entities, which use SMSCs for delivery of the SMS messages to a particular mobile device).

It is to be understood that various cell tower/base station/MSC arrangements are possible and could be used with the wireless portion of the system 16. For example, a base station 19 and a cell tower 18 may be co-located at the same site or they could be remotely located, or a single base station 19 may be coupled to various cell towers 18, or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the service center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks such as wireless local networks (WLANs) or networks providing broadband wireless access (BWA), or any combination thereof.

The service centers of the telematics service provider (which will be referred to herein as the telematics service centers 24) are designed to provide the vehicle hardware 26 with a number of different system back-end functions. According to the example shown in FIG. 1, one telematics service center 24 generally includes one or more switches 68, servers 70, databases 72, live and/or automated advisors 62, 62', processing equipment (or processor) 84, a communications module 86, as well as a variety of other telecommunication and computer equipment 74 that is known to those skilled in the art. These various telematics service provider components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs enabling the processor 84 to accomplish a variety of telematics service center 24 functions. The various operations of the telematics service center 24 are carried out by one or more computers (e.g., computer equipment 74). The computer equipment 74 (including computers) may include a network of servers (including server 70) coupled to both locally stored and remote databases (e.g., database 72) of any information processed. In an example, the processor 84 executes computer software for receiving and processing the vehicle data received from the telematics unit 14 during a VDU event. The processor 84 uses the vehicle data to formulate a request to be transmitted to the communications service provider 90 to disable incoming and/or outgoing communications to/from the mobile device 98.

In an example, the communications module 86 includes suitable communications equipment that enables the telematics service center 24 to establish a communication with the mobile communications provider 90 (such as to transmit the request to disable the communication(s) to/from the mobile device 98), or visa versa. This equipment may, for instance, be capable of handling voice calls, packet data sessions, or other messaging-based communications between the telematics service center 24 and the communications service provider 90 (e.g., via a circuit-switch network), messaging (e.g., via VehComm), modems, TCP/IP supporting equipment, and/or the like.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

It is to be appreciated that the telematics service center 24 may be any central or remote facility, manned or unmanned, mobile or fixed, to or from which it is desirable to exchange voice and data communications. As such, the live advisor 62 may be physically present at the telematics service center 24 or may be located remote from the telematics service center 24 while communicating therethrough.

The communications service provider 90 generally owns and/or operates the carrier/communication system 16. The communications network provider 90 includes a mobile network operator that monitors and maintains the operation of the communications network 90. The network operator directs and routes calls, and troubleshoots hardware (cables, routers, network switches, hubs, network adaptors), software, and transmission problems. It is to be understood that, although the communications network provider 90 may have back-end equipment, employees, etc. located at the telematics service center 24, the telematics service provider is a separate and distinct entity from the network provider 90. In an example, the equipment, employees, etc. of the communications network provider 90 are located remote from the telematics service center 24 (as shown in FIG. 1). The communications network provider 90 provides the user with telephone and/or Internet services, while the telematics service provider provides a variety of telematics-related services (such as, for example, those discussed hereinabove). It is to be understood that the communications network provider 90 may interact with the telematics service center 24 to provide services (such as emergency services) to the user.

While not shown in FIG. 1, it is to be understood that in some instances, the telematics service center 24 is a data center having one or more application specific call centers associated therewith. In one example, the data center receives voice or data calls, analyzes the request associated with the voice or data call, and transfers the call to an appropriate application specific call center. It is to be understood that the application specific call center may include all of the components of the data center, but is a dedicated facility for addressing specific requests, needs, etc. Examples of application specific call centers include, but are not limited to, emergency services call centers, navigation route call centers, in-vehicle function call centers, or the like. In another example, the data center is a data repository, while the call center(s) receives voice or data calls and analyzes the request associated with the voice or data call.

Examples of the method for controlling mobile communications to/from a mobile communications device (such as the mobile device 98) will now be described. The controlling of the mobile communications is accomplished while the mobile device 98 is located inside a mobile vehicle (such as the vehicle 12). As mentioned above, the examples utilize the communications service provider 90 to disable (and re-enable) incoming communications for the mobile device 98 and/or outgoing communications from the mobile device 98. The disabling of the mobile communications is accomplished in response to a request to do so from the telematics service provider 24. It is to be understood that the initiating of the disabling and re-enabling is also directly linked to triggers detectable by the in-vehicle telematics unit 14, where the triggers are generally associated with an operational state of the vehicle 12. Upon detecting a trigger, the telematics unit 14 automatically initiates a vehicle data upload event with the telematics service center 24, which transmits the vehicle and operator data to identify the mobile device 98. The telematics service center 24 thereafter submits a request to the communications service provider 90 to disable (or re-enable) communications to/from the mobile device 98. Details of the foregoing process will be further described below.

Before the mobile communications may be controlled, the mobile device 98 is first associated with an operator of the vehicle 12. This may be accomplished by registering the mobile communications device 98 with the telematics service center 24. In an example, registering may be accomplished by accessing (via, e.g., a computer station having Internet access capabilities) the remotely accessible page (or webpage) 96 and submitting, into a login screen on the webpage 96, an acceptable login and password (or identifying and authenticating information). Once the webpage 96 has been accessed, the person accessing the webpage 96 (which is typically an authorized user of the vehicle 12) may select (e.g., by selecting a menu option or an icon displayed on the webpage 96 screen) a program configured to associate the mobile communications device 98 with a particular vehicle 12 operator. In some cases, associating the mobile device 98 with the vehicle 12 operator is the same as enrolling the mobile device 98 in a program for selectively controlling communications to/from the mobile device 98 via the communications service provider 90. In an example, the user may access his/her user profile through the webpage 96, which typically includes information pertaining to the user and the user's vehicle 12. In many cases, the user profile will also include identification information of the vehicle 12 operator (e.g., his/her name, address, personal identification number or code, etc.) who possesses or otherwise owns the mobile device 98. In these cases, the user submits identification information of the mobile device 98 (e.g., its serial number, phone number, etc.), and indicates (e.g., via a mouse click on an appropriate icon or menu option on the webpage 96) to associate the device 98 with the identified vehicle 12 operator. In cases where the vehicle 12 operator is not identified in the user's profile, the user may submit both identification information of the vehicle operator and identification information of the mobile device 98, and indicate via the webpage 96 that the vehicle operator and the mobile device 98 are linked or associated with each other. The fact that the mobile device 98 is linked to or associated with the vehicle operator may then be stored in a user profile in one of the databases 72 at the telematics service center 24.

Registering the mobile device 98 may otherwise be accomplished by placing a call (using, e.g., the telematics unit 14, the mobile device 98, or other communications device) to the telematics service center 24, and submitting a request to the advisor 62, 62' to associate the mobile device 98 with the vehicle 12 operator, or visa versa. More specifically, the call is received at the switch 68, which directs the call to an appropriate advisor 62, 62' at the telematics service center 24 (or to an appropriate call center if the call is received at a data center). Upon authorizing the caller (e.g., by accurately responding to a number of challenge questions), the caller may submit the identification information of the mobile device 98 to the advisor 62, 62', who/which may use the information to associate the mobile device 98 with the vehicle 12 operator and store it in the user profile in the database 72. In an example, the advisor 62, 62' may access the webpage 96 and link the mobile device 98 and the vehicle 12 operator (e.g., as if the user had accessed the webpage 96 him/herself).

Further, the vehicle operator who possesses and/or owns the now-registered mobile device 98 may also be associated with a particular key fob 104. Typically, two key fobs 104 are provided with each vehicle 12 when the vehicle changes ownership (e.g., when purchased or leased from a dealership), however several key fobs 104 (i.e., more than two) may be provided. These key fobs 104 are usually configured at the dealership by synchronizing the key fobs 104 with the body control module of the vehicle 12, and this process is often referred to as a key fob learning mode. Each key fob 104 includes a plurality of rolling codes that are transmitted to the module 102 (such as the body control module) along with a function code when the vehicle operator actuates a vehicle function via the key fob 104 (such as a door unlock function). The module 102 receives the synchronized codes, and then acts on the function code (e.g., to unlock the door).

In addition to being associated with a particular vehicle 12, the key fob 104 may also be associated with a particular vehicle operator. This may be accomplished, for example, by accessing the remotely accessible page 96, and registering the key fob 104 via the same process described above for registering the mobile device 98. Briefly, the webpage 96 may be accessed by the vehicle owner, another authorized person, and/or by an advisor 62, 62' when an authorized user calls the telematics service center 24. When the webpage 96 is accessed, the key fob 104 may be associated with the vehicle operator by submitting identification information of the key fob 104 (e.g., its serial number, etc.), and indicating (e.g., via a mouse click on an appropriate icon or menu option on the webpage 96) to associate the key fob 104 with the vehicle operator. It is to be understood that when the key fob 104 is associated with the vehicle operator, the key fob 104 is also associated with that operator's mobile device 98.

The key fob 104 may also or otherwise be associated with the vehicle operator by registering the key fob 104 with the in-vehicle module 102, or with the telematics unit 14 in instances where the telematics unit 14 assumes the functionality of the module 102. This may be accomplished, for example, upon purchasing or otherwise taking possession of the vehicle 12. For example, the dealership may associate a particular key fob 104 with a particular vehicle operator when all of the key fobs 104 are initially synchronized with the vehicle 12.

It is to be understood that the user (or caller) may want to associate or link a number of number of mobile devices 98 with respective vehicle operators. In this example each mobile device 98 is associated with a particular key fob 104. For instance, the vehicle 12 may have a number of different vehicle operators that may each individually possess his/her own mobile device 98 and his/her own key fob 104. For example, the vehicle 12 may be shared by two or more people (such as a family vehicle, where the father, mother, and son are each able to operate the vehicle 12), and each person owns or has in his/her possession an individual mobile communications device 98 and an individual key fob 104. Accordingly, each of the mobile devices 98 and each of the key fobs 104 may be associated with their respective vehicle operators using any of the example methods described herein. It is further to be understood that the user (or caller) may want to associate or link one mobile device 98 (or one key fob 104) with multiple vehicle operators. For instance, the mother and father of a family may share a single mobile device 98 (or a single key fob 104). Accordingly, the single mobile device 98 (or single key fob 104) may be associated with all of the vehicle operators using any of the example methods described above.

During the registering of the mobile device 98 and the key fob 104 (via the webpage 96 or during the phone call with the telematics service center 24), one or more preset conditions of the mobile device 98 may be set by the user/caller. These preset conditions are selected by the user/caller and generally identify a particular mobile device 98 who's incoming and/or outgoing communications should be disabled, and ii) the events that, upon the occurrence thereof, will trigger the disabling of the communications. These events are referred to herein as first in-vehicle triggers. The preset conditions also identify the events that, upon the occurrence thereof, will trigger the re-enabling of the previously disabled communications. These events are referred to herein as second in-vehicle triggers. As will be described in further detail below, upon detecting an appropriate trigger, the communications of the mobile device 98 associated with the trigger (as set by the user in the preset conditions) may be disabled or re-enabled.

It is to be understood that the preset conditions set by the user may be the same for each of the registered mobile devices 98 (in instances where more than one mobile device 98 is associated with the telematics unit 14). For instance, the preset conditions may include the disabling of incoming communications for the mobile device 98 and/or outgoing communications from the mobile device 98, where such communications are text messages. It is to be understood that the examples of the method disclosed herein are not necessarily limited to disabling a text messaging function of the mobile device 98, but may also be used to disable other functions of the mobile device (such as, e.g., an e-mailing function, a voice calling function, etc.). It is further to be understood that different preset conditions may otherwise be set for each respective mobile device 98. For instance, mobile devices 98 possessed by Mom and Dad in a family that includes members who are authorized to drive the vehicle 12 may be completely unrestricted (i.e., the respective mobile devices 98 are not disabled in response to a trigger), whereas the mobile device 98 for Charlie (Mom and Dad's son) may include a restriction on all text messaging capabilities. This restriction may be applied in response to a trigger, such as an ignition-on state of the vehicle (i.e., a first in-vehicle trigger), and a removal of the restriction (i.e., the re-enabling of all of the text messaging capabilities) in response to an ignition-off state of the vehicle (i.e., a second in-vehicle trigger).

The preset conditions are generally set until the authorized user accesses the webpage 96 (or calls the telematics service center 24), and removes or otherwise changes the preset conditions associated with one or more of the mobile devices 98. The removed/changed preset conditions will take effect as soon as they are stored in the user profile, and remain as active preset conditions until changed by the user, or the user's subscription with the telematics service center 24 expires or is canceled, or for a duration predefined by the user. It is further to be understood that authorized persons alone are allowed to remove/change the preset conditions stored in the user profile (e.g., Mom and Dad may be authorized to remove/change the preset conditions for all of the mobile devices 98 registered with the vehicle 12, whereas Charlie (their son) may not be authorized). Those that are authorized to remove/change the preset conditions are pre-established by the user who originally set up the subscription account, or by others who the user has indicated as being authorized to change the preset conditions. Those that are authorized to remove/change the preset conditions may be identified, by the user, when the preset conditions are originally set up and/or may be added or removed at any subsequent time.

Once the preset conditions are set (or each time the preset conditions are changed), the preset conditions may be stored in a user profile in one of the databases 72 at the telematics service center 24. As will be described in further detail below, upon receiving the vehicle data from the telematics unit 14, the service center 24 retrieves information from the user profile, including the preset conditions, and transmits some or all of the information to the communications service provider 90. Upon receiving this information from the telematics service center 24, along with a request to disable communications of the mobile device 98, the communications service provider 90 transmits a signal to the mobile device 98 to disable the communications.

Further, once the preset conditions are set (or each time the preset conditions are changed), the preset conditions are also directly downloaded to and stored in the memory 38 of the telematics unit 14 from the webpage 96 or telematics service center 24. The preset conditions (which include i) the identity of the mobile devices 98, the key fobs 104, and the vehicle operators associated with specific mobile devices 98 and key fobs 104, ii) the restrictions (if any) applied to each of the mobile devices 98, and iii) the triggers associated with the applying of the restrictions) are utilized by the telematics unit 14 to ultimately identify the vehicle operator, and to detect or identify a trigger to disable (or re-enable) the identified feature/sub-feature of the mobile device 98 associated with the vehicle 12 operator.

An example of the method for controlling communications of one or more of the mobile devices 98 begins with identifying an operator of the vehicle 12. In an example, the operator may be identified by detecting the operator's key fob 104 when he/she uses the key fob 104 to actuate at least one vehicle function (e.g., a door unlock function, a trunk opening function, etc.). For instance, upon actuating a door unlock function via the key fob 104 (which may be accomplished, e.g., by pressing an unlock button on the key fob 104 itself), a signal is transmitted from the key fob 104 to the body control module to unlock the vehicle 12 doors. The signal transmitted by the key fob 104 may include an identifier embedded therein, which may be used by the body control module (BCM) to identify the key fob 104 that was used to actuate the command.

As mentioned above, the restrictions placed upon the mobile device 98 of the vehicle 12 operator (as defined by the preset conditions) may be applied upon recognizing one or more predefined triggers. These particular triggers are referred to herein as first in-vehicle triggers, and are recognizable by the in-vehicle telematics unit 14. In an example, the first in-vehicle trigger may be associated with an operational state of the mobile vehicle 12, such as an ignition ON state of the mobile vehicle 12 (e.g., when a key or fob 104 is placed into the ignition and is operated to initiate an ignition ON state of the vehicle 12, or at least to initiate an ON state of the electronics of the vehicle 12) or a shift of a transmission system of the vehicle 12 into a drive mode. When the ignition ON state is the trigger, as soon as the electronics and/or the engine of the vehicle 12 are/is started, the telematics unit 14 queries the body control module 102 for the identifier of the key fob 104 that was used to actuate the previously-described vehicle function. The BCM 102 responds to the query by identifying a rolling code of the key fob 104, and then synchronizing the rolling code with an identifier of the key fob 104. The BCM 102 thereafter transmits a message back to the telematics unit 14 over the vehicle bus 34 with the requested identifier of the key fob 104 that was used. Alternatively, the BCM 102 may place a message on the vehicle bus 34 containing the identifier, and the telematics unit 14 may retrieve the message.

In instances where the BCM 102 is embedded in or integrated with the telematics unit 14, the telematics unit 14 itself identifies the key fob 104 that was used to actuate the vehicle function. This may be accomplished by the telematics unit 14 in the same way as the BCM 102 (i.e., by identifying the rolling code of the key fob 104, and then synchronizing the rolling code with the key fob 104 identifier).

The operator of the vehicle 12 may otherwise be identified upon pairing the mobile communications device 98 with the telematics unit 14. Via the preset conditions stored in the telematics unit 14, the telematics unit 14 is aware of the mobile device(s) 98 that it is associated therewith, and thus continuously monitors (via, e.g., the antenna 51) for the presence of one or more of the associated mobile devices 98 inside the vehicle 12. Upon detecting the presence of one of the mobile devices 98 (which, for example, may occur when the mobile device 98 is carried into the vehicle 12 with the person in possession of the device 98 and both devices 98 and 14 are in an ON state), the telematics unit 14 pairs with the mobile device 98 via the short range wireless network 48 (such as, e.g., a BLUETOOTH® connection).

As soon as the vehicle operator is identified (either by identifying the key fob 104 or by identifying the mobile device 98 upon pairing with the telematics unit 14), the telematics unit 14 is configured to place a data call to the service center 24, where the data call includes the identifier.

The identifier may be the key fob identifier or the mobile device identifier (i.e., MIN/MDN/ESN and a MAC). It is to be understood that when the vehicle operator is identified by obtaining the identifier of the key fob 104, the telematics unit 14 automatically initiates a data call upon obtaining the identifier. However, in instances where the vehicle operator is identified when the telematics unit 14 is paired with the mobile device 98, the data call may be automatically initiated as soon as the pairing is accomplished. The vehicle data that is received at the telematics service center 24 from the telematics unit 14 is processed by processor 84. This processing involves associating the identification information of the mobile device 98 or of the key fob 104 with the operator of the vehicle 12. For instance, the processor 84 may access the user profile stored in the database 72 (will contain one or both identifiers), and then cross reference the identifier of the mobile device 98 or of the key fob 104 contained in the vehicle data transmission with information contained in the user profile. This cross referencing is accomplished to determine at least a name or other identifier of the person associated with the mobile device 98 or the key fob 104. In instances where the mobile device 98 identifier is contained in the vehicle data transmission, the processor 84 may obtain the owner or possessor of the mobile device 98 directly from the user profile. However, in instances where the key fob 104 identifier is contained in the transmission, the processor 84 may obtain the owner or possessor of the key fob 104, and then use this information to also identify which mobile device 98 is associated with that particular owner/possessor. For example, when the user profile contains the key fob 104 identifier, it will also include information linking the key fob 104 to a particular mobile device 98.

The processor 84 examines the user profile to determine if any restrictions are associated with key fob 104 or the mobile device 98 identified by the identifier. The processor 84 extracts any preset conditions associated with the now-identified mobile device 98 from the user profile. As mentioned above, these preset conditions may include one or more restrictions related to the identified mobile device 98 as described above. If, for instance, the processor 84 determines that no restrictions are associated with the identified key fob 104 and its associated mobile device 98 or with the identified mobile device 98, the service center 24 will either i) send a message back to the telematics unit 14 indicating the same, or ii) do nothing. In the former instance, upon receiving the message, the telematics unit 14 may disconnect with the in-vehicle user's mobile device, or may remain connected so that he/she can still use the mobile device 98 through the hands free unit 14.

The processor 84 may then compile the information extracted from the user profile (i.e., the mobile device 98 identifier and the restriction(s) set forth in the preset conditions to be applied to the mobile device 98), and transmits, via the communications module 86, the information to the communications service provider 90 in the form of a message. This information is transmitted to the service provider 90 along with a request to disable the incoming communications for the mobile device 98 and/or the outgoing communications from the mobile device 98 as defined by the preset conditions.

In an example, the communications service provider 90 forwards the incoming message transmitted thereto from the telematics service center 24 directly to a processing facility (such as an SMSC) associated with the service provider 90. The SMSC immediately applies the restrictions placed upon the identified mobile device 98. For instance, when incoming communications for the mobile device 98 are disabled, the incoming communications for the mobile device 98 do not pass through the SMSC and to the mobile device 98. These incoming messages are stored at the SMSC until the restriction placed upon the mobile device 98 is removed. Upon removal of the restriction, the SMSC forwards any stored incoming communications to the mobile device 98. In another instance, when outgoing communications from the mobile device 98 are disabled, although a message may be physically generated, such message cannot be transmitted to a desired recipient. In other words, the mobile device 98 may be considered to be non-active or otherwise disconnected when incoming and/or outgoing communications for/from the device 98 are disabled.

In an example, a default or pre-selected message may be generated from the processing facility (such as an SMSC, as described above in conjunction with the FIG. 1 description) when new incoming messages for the mobile device 98 are received by the SMSC but are not passed on to the mobile device 98 at least in part because of the restrictions then-currently being applied to the device 98. This default message may be transmitted to the sender of the incoming communication for the mobile device 98. For instance, the default message may reply to the incoming SMS messages with a response that the device 98 is unavailable, the operator is not taking messages, or the like. In an example, the preset conditions incorporated in the request processed by the SMSC may include an instruction for the SMSC to reply to any incoming SMS or text messages while the mobile device 98 is disabled. In this example, the SMSC may be configured to automatically reply to any incoming SMS messages as soon as the device 98 is disabled.

In another example, the SMSC may be configured to automatically reply to an incoming SMS message upon receiving the incoming message. In some instances, the automatic reply may be generated to any incoming SMS messages upon recognizing an event pertaining to a specific operational state of the vehicle 12 (such as movement of the vehicle 12 in excess of a predefined vehicle speed) and/or a short range wireless connection established between the mobile device 98 and the telematics unit 14. For instance, the telematics unit 14 may detect the vehicle speed, and if the speed exceeds a predefined threshold (e.g., 15 mph), the telematics unit 14 automatically transmits a signal to the telematics service center 24, which forwards the signal to the communications service provider 90 and thus the SMSC.

It is to be understood that the mobile device 98 may be disabled until the telematics unit 14 recognizes another in-vehicle trigger (i.e., the second trigger mentioned above) to initiate re-enabling of the device 98. Non-limiting examples of the second trigger include an ignition OFF state of the vehicle 12 or a shift of the transmission system of the vehicle 12 into a park mode. The second trigger may also be the unpairing of the mobile device 98 from the telematics unit 14.

Upon recognizing the second trigger, the telematics unit 14 initiates another vehicle upload event with the telematics service center 24, where the vehicle data that is transmitted includes a notice that the second in-vehicle trigger has occurred. Upon receiving the vehicle data (and the notice) from the telematics unit 14, the service center 24 transmits, via the communications module 86, a request to the communications service provider 90 to re-enable communications of the mobile device 98.

The re-enabling of the device 98 generally includes the re-enabling of receiving incoming communications by the device 98 and/or sending outgoing communications from the device 98. For example, if the feature that is disabled includes blocking all incoming communications, then re-enabling of the feature includes allowing all incoming communications (e.g., text messages) to be received by the mobile device 98. In this example, all of the blocked messages may be temporarily stored, e.g., at the SMSC until the device 98 is re-enabled.

While several examples have been described in detail, it will be apparent to those skilled in the art that the disclosed examples may be modified. Therefore, the foregoing description is to be considered exemplary rather than limiting.

The invention claimed is:

1. A method for controlling mobile communications, the method comprising:
    identifying an operator of the mobile vehicle, the operator being associated with a mobile communications device;
    via a telematics unit in the mobile vehicle, recognizing a first in-vehicle trigger, the recognizing initiating a vehicle data upload event with a telematics service center, wherein vehicle data for the vehicle data upload event includes identification information of the mobile vehicle and of the operator of the mobile vehicle;
    upon receiving the vehicle data at the telematics service center, transmitting, via a communications module operatively associated with the telematics service center, a request to a mobile communications service provider to disable at least one of an incoming or an outgoing communication for the mobile communications device; and
    by the mobile communications service provider without involvement by the mobile communications device, disabling the at least one of the incoming or the outgoing communication.

2. The method as defined in claim 1 wherein the identifying of the operator of the mobile vehicle includes:
    detecting a key fob upon initiating at least one vehicle function with the key fob; and
    identifying the operator who has previously been associated with the key fob.

3. The method as defined in claim 2 wherein prior to the detecting and the identifying, the method further comprises associating the key fob with the operator of the mobile vehicle by registering the key fob utilizing a remotely accessible page, the telematics unit, an in-vehicle module, or combinations thereof.

4. The method as defined in claim 2 wherein the mobile vehicle has more than one key fob associated therewith, wherein each of the key fobs is respectively associated with a different vehicle operator, and wherein the method further comprises:
    via the telematics unit, querying an in-vehicle module requesting an identification of which key fob is then-currently initiating the at least one vehicle function;
    via the in-vehicle module, identifying a rolling code of the key fob initiating the at least one vehicle function;
    via the in-vehicle module, synchronizing the rolling code with an identifier of the key fob; and
    transmitting the identifier of the key fob to the telematics unit.

5. The method as defined in claim 1 wherein the identifying of the operator of the mobile vehicle is accomplished by pairing the mobile communications device with the telematics unit, the pairing being accomplished using short range wireless communication between the mobile communications device and the telematics unit.

6. The method as defined in claim 1 wherein the first in-vehicle trigger is selected from an ignition on state of the mobile vehicle or a shift of a transmission system of the mobile vehicle into a drive mode.

7. A method for controlling mobile communications, the method comprising:
    identifying an operator of the mobile vehicle, the operator being associated with a mobile communications device;
    via a telematics unit in the mobile vehicle, recognizing a first in-vehicle trigger, the recognizing initiating a vehicle data upload event with a telematics service center, wherein vehicle data for the vehicle data upload event includes identification information of the mobile vehicle and of the operator of the mobile vehicle;
    upon receiving the vehicle data at the telematics service center, via a processor at the telematics service center:
        associating the identification information of the mobile vehicle with the operator of the mobile vehicle;
        accessing a profile of the operator stored in a database at the telematics service center; and
        extracting i) at least one preset condition from the profile, the at least one preset condition including a restriction related to the at least one feature of the operator's mobile communications device, and ii) an identifier of the operator's mobile communications device;
    transmitting, via a communications module operatively associated with the telematics service center, a request to a mobile communications service provider to disable at least one of an incoming or an outgoing communication for the mobile communications device; and
    disabling the at least one of the incoming or the outgoing communication.

8. The method as defined in claim 7 wherein the request to disable the at least one feature associated with the mobile communications device includes the at least one preset condition and the identifier extracted from the profile.

9. The method as defined in claim 8, further comprising:
    forwarding the request to a processing facility associated with the mobile communications service provider; and
    processing the request via computer equipment associated with the processing facility.

10. The method as defined in claim 1 wherein the incoming communication is a short messaging service (SMS) message, a multimedia message service (MMS) message, an e-mail, or a voice message.

11. The method as defined in claim 1, further comprising:
    via the telematics unit, recognizing a second in-vehicle trigger, the recognizing initiating a second vehicle data upload event with the telematics service center, vehicle data for the second vehicle data upload event including a notice that the second in-vehicle trigger has occurred; and
    in response to the second vehicle data upload event, transmitting, via the communications module operatively associated with the telematics service center, a request to the mobile communications service provider to re-enable the at least one of the incoming or outgoing communication for the mobile communications device of the operator.

12. The method as defined in claim 11 wherein the second in-vehicle trigger is selected from an ignition off state of the mobile vehicle and a shift of the transmission system of the mobile vehicle into a park mode.

13. The method as defined in claim 1 wherein after the at least one of the incoming or the outgoing communication has been disabled, the method further comprises:
    receiving the incoming communication for the mobile communications device at the mobile communications service provider; and via a processing facility associated with the mobile communications service provider, sending a reply to the incoming message, the reply including an indication that the operator is unavailable to respond to the incoming communication at the then-current time.

14. The method as defined in claim 13 wherein the sending of the reply is accomplished in response to an occurrence of at least one of a pairing of the communications device to the telematics unit via a short range wireless connection or detecting movement of the mobile vehicle in excess of a predefined vehicle speed.

15. The method as defined in claim 14 wherein the sending of the reply is accomplished automatically immediately upon receiving the incoming message.

16. A system for controlling mobile communications, comprising:
a mobile communications device associated with an operator of a mobile vehicle, the mobile communications device configured to receive and send messages;
a module operatively disposed in the mobile vehicle, the module configured to identify the operator of the mobile vehicle;
a telematics unit operatively associated with the module, the telematics unit configured to recognize a first in-vehicle trigger and, upon making the recognition, initiate a vehicle data upload event with a telematics service center, wherein vehicle data for the vehicle data upload event includes identification information of the mobile vehicle and the operator of the mobile vehicle;
a processor operatively associated with the telematics service center and configured to receive and process the vehicle data during the vehicle data upload event;
a communications module operatively associated with the telematics service center, the communications module configured to transmit a request to a mobile communications service provider to disable at least one of an incoming or an outgoing message for the mobile communications device; and
a processing facility in communication with the mobile communications service provider, the processing facility configured to receive the request forwarded thereto from the mobile communications service provider, and to disable at least one of the incoming or the outgoing message for the mobile communications device.

17. The system as defined in claim 16, further comprising a key fob associated with the operator of the mobile vehicle and, when actuated to initiate at least one vehicle function, is configured to be detected by the module to identify the operator.

18. The system as defined in claim 17, further comprising a remotely accessible page for registering the key fob such that the key fob is associated with the operator of the mobile vehicle.

19. The system as defined in claim 17 wherein at least one of the telematics unit or the module is further configured to register the key fob such that the key fob is associated with the operator of the mobile vehicle.

20. The system as defined in claim 16 wherein:
the telematics unit is further configured to recognize a second in-vehicle trigger, and upon making the recognition, to initiate a second vehicle data upload event with the telematics service center, wherein vehicle data for the second vehicle data upload event includes a notice that the second in-vehicle trigger has occurred;
the communications module associated with the telematics service center is further configured to transmit a request to the mobile communications service provider in response to the second vehicle data upload event to re-enable the at least one of the incoming or outgoing message for the mobile communications device.

* * * * *